(12) United States Patent
Alberth, Jr. et al.

(10) Patent No.: US 6,758,396 B1
(45) Date of Patent: Jul. 6, 2004

(54) SMART CARD BASED DRUG PRESCRIPTIONS

(75) Inventors: William P. Alberth, Jr., Crystal Lake, IL (US); Scott A. Steele, San Diego, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/317,609

(22) Filed: Dec. 11, 2002

(51) Int. Cl.$^7$ .............................................. G06K 5/00
(52) U.S. Cl. ...................................... 235/380; 700/242
(58) Field of Search .............................. 235/380, 492, 235/375, 441; 700/242

(56) References Cited

U.S. PATENT DOCUMENTS

| | | | | |
|---|---|---|---|---|
| 4,695,954 A | * | 9/1987 | Rose et al. | .................... 221/15 |
| 5,193,114 A | * | 3/1993 | Moseley | ..................... 713/183 |
| 5,291,399 A | * | 3/1994 | Chaco | ........................... 705/3 |
| 5,528,021 A | * | 6/1996 | Lassus et al. | ................ 235/380 |
| 6,032,085 A | * | 2/2000 | Laurent et al. | ............. 700/242 |
| 6,145,739 A |   | 11/2000 | Bertina et al. | |
| 6,161,757 A | * | 12/2000 | Morris | ........................ 235/375 |

FOREIGN PATENT DOCUMENTS

| WO | WO 97/22092 | * | 6/1997 | ............. G07F/7/10 |
|---|---|---|---|---|

\* cited by examiner

*Primary Examiner*—Karl D. Frech
*Assistant Examiner*—Daniel A. Hess
(74) *Attorney, Agent, or Firm*—Ingrassia Fisher & Lorenz PC

(57) ABSTRACT

A method and apparatus for securely transferring medical information is provided, which included storing information relating to a medical prescription item on a smart card using an encryption method that provides independent verification as to the source of the information, verifying the source of the information by the provider of the medical prescription item and modifying the stored information relating to the medical prescription item when the prescription is filled, and storing the modified information on the smart card using an encryption method that provides independent verification of the source of the modified information.

13 Claims, 3 Drawing Sheets

SMART CARD BASED DRUG PRESCRIPTIONS

FIELD OF THE INVENTION

The present invention generally relates to methods and apparatus for storing information, and more particularly relates to storing medical information on electronic transfer media.

BACKGROUND OF THE INVENTION

Prescriptions for medicines, drugs, or other medical items are presently written or typed on pieces of paper. The paper is then submitted to a pharmacist or other fulfiller of medical prescriptions to be filled. Where the prescription has been hand-written, it is left to the pharmacist to interpret the handwriting, sometimes poor, of the prescribing medical practitioner. Furthermore, the pharmacist must determine whether the prescription may have been modified, or, indeed, whether the prescription is valid or has been written on a stolen or otherwise illegally acquired prescription form.

In the case of typewritten prescriptions, the handwriting legibility is less of a problem, but the questions regarding modification and validity may still remain.

In a highly mobile society such as the one in which we presently reside, it is becoming increasingly difficult to have prescriptions filled in areas where the particular medical practitioner is not located, for reasons such as unfamiliarity with the medical practitioner, his signature, and other indicia upon which pharmacists or other entities for filling prescriptions may rely to judge the validity of a particular prescription.

Accordingly, it is desirable to provide a secure method and apparatus for holding medical prescription and other sensitive medical data, perhaps provided by a medical practitioner to a patient, and allowing the secure transfer of such data to others that may have a reason to access the data. In addition, it is desirable for a receiver of such sensitive medical data or prescriptions to be able to validate the origin of the information and the validity thereof. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
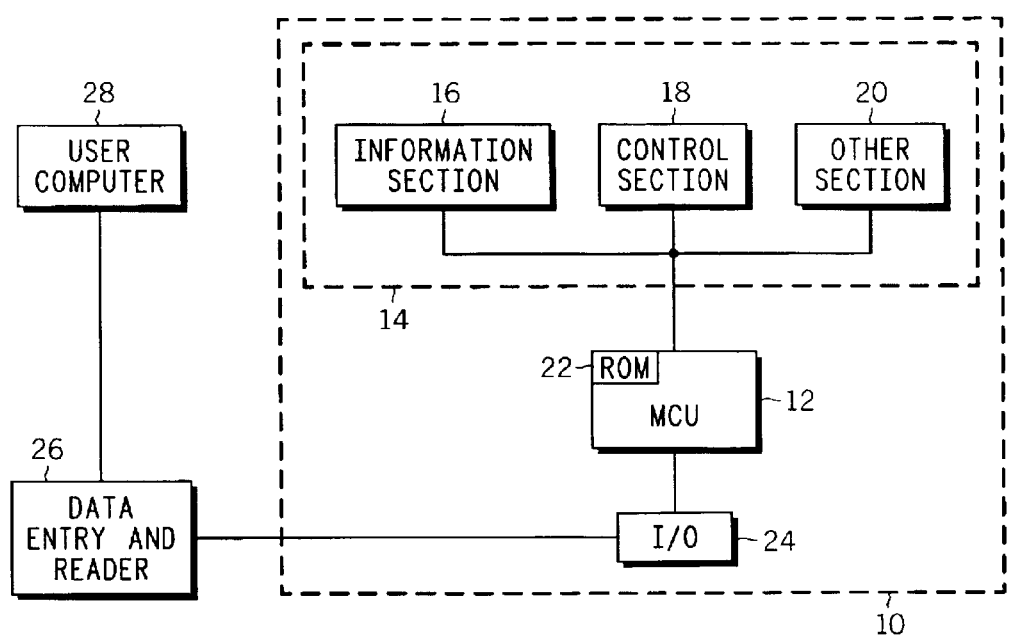
FIG. 1 is a partially schematic drawing showing certain aspects of a smart card that may be used in conjunction with the present invention.

FIG. 1 shows a schematic representation of a smart card 10 as used in the instant invention. For purposes of describing a preferred embodiment of the invention, a smart card is shown, but it is understood that any equivalent data transfer device other than a smart card could be used, for example, smart card 10 may be encapsulated in any convenient form so long as the functions performed by the smart card 10 are similar in operation to that shown in FIG. 1.

The use of a smart card has several advantages, including portability, a known and accepted form factor, existing packaging technology, existing semiconductor technology for use in smart cards, and existing card reading technology.

Smart card 10 has embedded therein a microprocessor or microcontroller unit (MCU) 12 which is coupled to a memory 14. The memory 14 is shown here as being a device that is independent of the MCU 12, but it is understood that the memory 14 may be a circuit that actually resides on the same chip as the MCU 12 or is included within the same package as the MCU 12. The memory 14 is also shown as comprising three separate sections for storing different types of information, but, again, memory 14 may be a single memory circuit which is partitioned electronically by the MCU 12. The memory is shown here having an information section 16, a control section 18 and an "other" information section 20, the significance of which memory sections will be described later in conjunction with the explanation of the operation of the invention. Memory 14 may also contain a control program (not shown) for controlling the operation of the MCU 12, or the control program may be formed as a separate circuit that resides on the MCU itself as ROM 22. An input-output circuit 24 is coupled to the MCU 12 to provide access for a user of the card to the contents of memory 14.

Further shown in FIG. 1 is a data entry/reader 26 which may be used to upload or download information to or from memory 14. Smart card 12 has contacts thereon (not shown) which are coupled to the input output circuit 24 to facilitate the transfer of information to and from memory 14 from an external source. Data entry/reader device 26 may be coupled to the computer 28 of a user of the smart card 10, and information from the computer 28 may be downloaded through entry/reader device 26, through input output circuit 24 and MCU 12 to the memory 14. Likewise data from memory 14 may be downloaded through MCU 12 and input/output device 24 and data entry/reader 26 to the computer 28 of a user.

Figure 2:
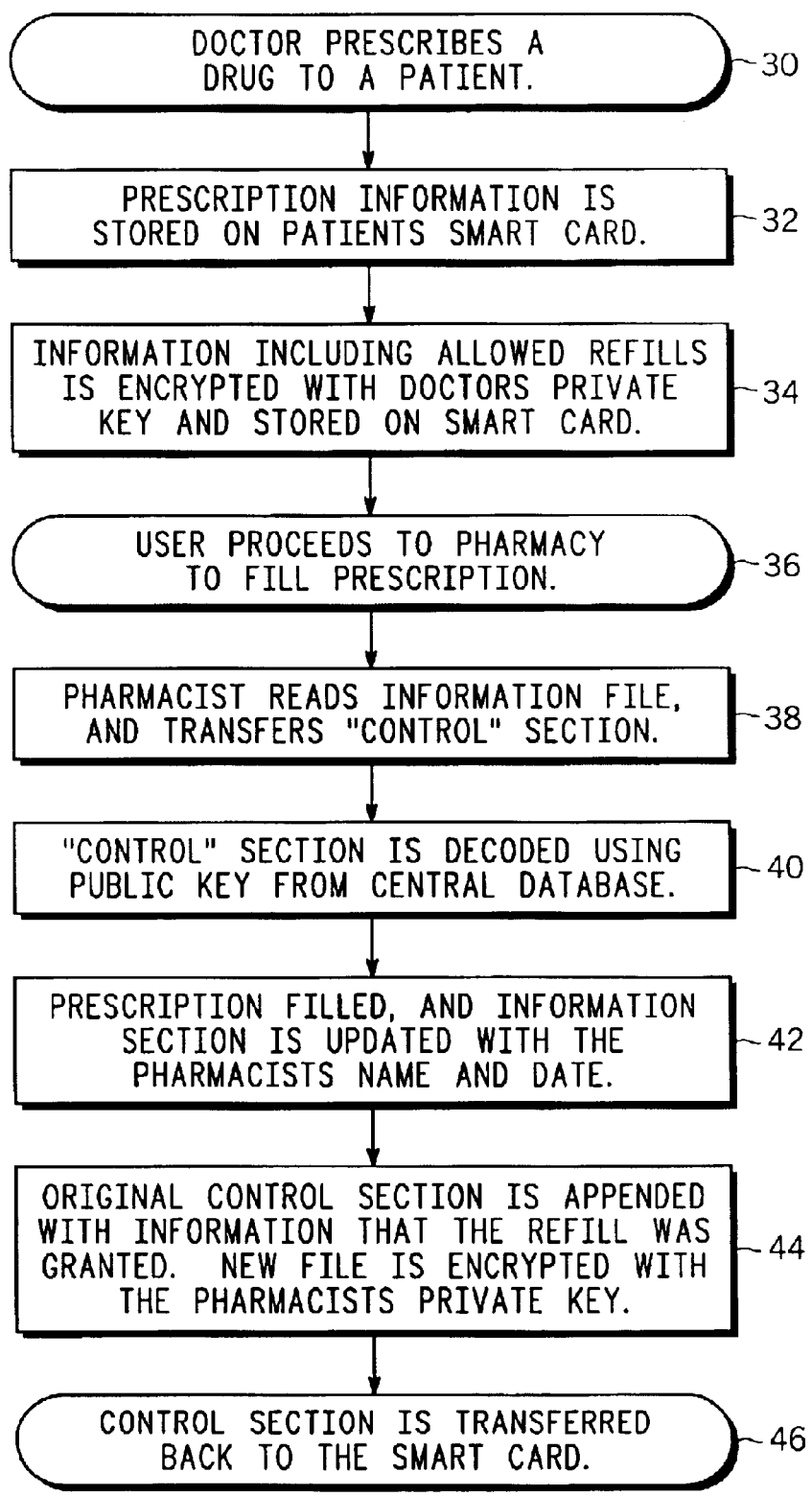
FIG. 2 is a flow diagram showing how a smart card of FIG. 1 could be used for entering and filling a prescription while practicing the present invention.

FIG. 2 is a flow diagram showing how the smart card 10 of FIG. 1 could be used for entering and filling a prescription while practicing the present invention. A doctor or medical practitioner prescribes a drug to a patient at 30. For example, the doctor may prescribe Valium, 60 doses, 20 mG, refillable three times. The patient gives his personal smart card 10 to the doctor who, by using the doctor's computer 28 loads a portion of the prescription information at 32, (for example: Valium, 20 mG, twice a day), together with the doctor's name and the date of the transaction into the information section 16 of the smart card 10 by downloading the information through entry/reader device 26, through input output circuit 24 and MCU 12 to the memory section 16 of memory 14.

A duplicate of the encrypted prescription information plus the number of times the prescription is authorized to be filled 34 is entered into the control section 18 of memory 14 along with the number of refills authorized. This information is encrypted in the doctor's computer 28 with the private security key of the doctor, part of a private key/public key security system.

The patient then proceeds to fill the prescription 36. The patient presents his smart card 10 to a pharmacist or other dispenser of medications or prescription filler.

The pharmacist reads the information file stored in the information section 16 of memory 14 and, using his computer 28 and data entry/reader 26, transfers the data from control section 18 of memory 14 to his computer 28. This transfer may proceed in the same manner in which money may be transferred from a smart card to another device to pay for a transaction of some sort.

The pharmacist then retrieves the public key of the prescribing doctor from a database of such public keys and decrypts the data of the control section 18 of memory 14 at 40. The pharmacist then proceeds to fill the prescription and, using computer 28, modifies the information section 16 of memory 14 indicating that one fill of the prescription has been accomplished. The pharmacist appends his name and the date of the transaction to the modified.

The modified control information including information that the prescription has been once filled is then encrypted at 44 using the pharmacist's private key and the encrypted, modified control information is transferred at 46 from the computer 28 through the data entry/reader device 26 and the input/output circuit 24 and MCU 12 of smart card 10 back into the control information section 18 of memory 14.

This process may be repeated several times at the same or different pharmacies. Each time a pharmacist would modify the data in the information section 16 and the control section 18 of memory 14 to indicate what action has been taken, until there are no more refills remaining on the prescription.

The system described above provides increased security over present prescription filling systems in which it is very difficult for a pharmacist to determine with certainty that a prescription is legitimate and has not been tampered with. This is accomplished by the use of an encryption model based on the public key-private key system or something equally easy to use and difficult to corrupt. The pharmacist, for example, by the very ability to use the public key of the prescribing doctor to decrypt the original prescription is given assurance that the prescription was, in fact, written by that doctor and has not been maliciously or illegally altered. The filling pharmacist, on the other hand, by encrypting his change (a reduction in the remaining number of refills available) in his private key, give assurance to a subsequent filler of prescriptions that the information of the smart card is genuine and has not been altered.

Furthermore, in a highly mobile society such as the one in which we presently reside, it is becoming increasingly difficult to have prescriptions filled in areas where the particular medical practitioner is not located, for reasons such as unfamiliarity with the medical practitioner, his signature, and other indicia upon which pharmacists may rely to judge the validity of a particular prescription.

Accordingly, it is an important feature of the instant invention to provide a secure method and apparatus for holding medical prescription and other sensitive medical data provided by a medical practitioner to a patient, and allowing the secure transfer of such data to others that may have a reason to access the data. In addition, it is desirable for a receiver of such sensitive medical data or prescriptions to be able to validate the origin of the information and the validity thereof.

Referring again briefly to FIG. 1, the portion of the memory 14 identified as "other" information may be used to store items regarding the health of the user of the card, such as illnesses, medical history, drugs being taken, allergies to medicines or other substances, insurance information, and the like, any of which may be of interest to emergency medical personnel in the event of an accident or unconsciousness of the card holder. This information may not be encrypted so as to allow easier access to the information by emergency or treating personnel.

As noted above, in a highly mobile society such as the one in which we presently reside, it is becoming increasingly difficult to have prescriptions filled in areas where the particular medical practitioner is not located, for reasons such as unfamiliarity with the medical practitioner, his signature, and other indicia upon which pharmacists may rely to judge the validity of a particular prescription. Presently available systems are not secure enough to allow the transmission of sensitive prescription information over the public airway, for example through a cellular telephone system.

Figure 3:
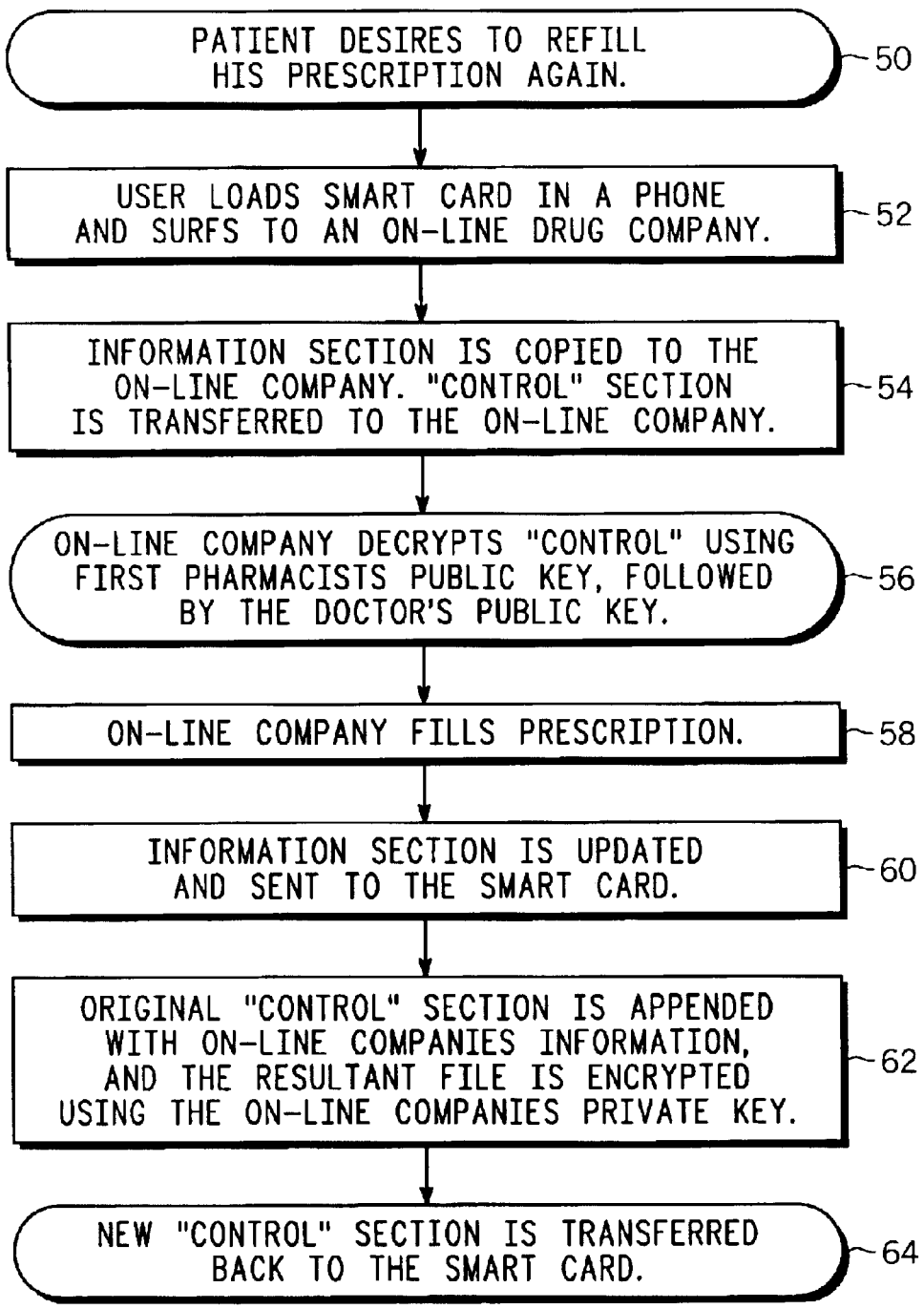
FIG. 3 is a flow diagram showing how a smart card of FIG. 1 could be used for initiating a refill of a prescription remotely while practicing the present invention.

FIG. 3 is a flow diagram showing how a smart card of FIG. 1 could be used for initiating a refill of a prescription remotely. If a patient chooses to refill 50 his prescription by mail order, the patient may access a person or entity for filling prescriptions over the internet, for example, where a reader/entry device 26 may be connected to the patient's computer 28. Alternatively, the patient may utilize a "smart" cellular telephone 52 with a provision for accepting the smart card 10 to transfer the appropriate information on the smart card to the prescription filling entity or on-line pharmacy. In either case, the information section 16 of the memory 14 is copied at 54 to the on-line pharmacy, as is the control information in section 18 of the memory 14.

The pharmacy then decrypts the control information using the most recent pharmacist's public key 56, in the case of a refill, or only the prescribing doctor's public key if the transaction is a first filling. (If the transaction is a first filling of the prescription, the on-line pharmacy would, of course, decrypt the control information using only the prescribing doctor's public key as set forth in the description of FIG. 2.) The public keys are obtained from a public key database. The on-line pharmacy fills the prescription 58.

The on-line pharmacy then appends the information section data 60 with the on-line pharmacy's information as above with reference to FIG. 2, and the information section as modified is transmitted back to the patient's smart card. The on-line pharmacy then updates the control information 62 that a second filling of the prescription has taken place. The modified control information is encrypted using the on-line pharmacy's private key, and the new control information is transmitted back to the patient's smart card 64.

The remote system described above has the same security attributes as the system and method described in FIG. 2. Since a secure and verifiable encryption system is used in both cases, a pharmacist, even a remote pharmacist has a great deal of confidence that the prescription with which he is working is valid and unaltered.

While an exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for securely transferring medical information comprising:

storing information relating to a medical prescription item on a smart card, using an encryption method which provides independent verification as to the source of the information;

verifying the source of the information by the provider of the medical prescription item;

modifying the stored information relating to the medical prescription item when the prescription is filled; and storing the modified information on the smart card using an encryption method that provides independent verification of the source of the modified information.

2. A method as set forth in claim 1 wherein additional medical information is stored on a portion of the smart card in an unencrypted form.

3. A method as set forth in claim 2 wherein the information stored in unencrypted form comprises information related to medical history information.

4. A method as set forth in claim 1 wherein the encryption method is a private key/public key encryption method and the medical prescription item is a prescription entered into the smart card by a medical practitioner using the medical practitioner's private encryption key.

5. A method as set forth in claim 4 wherein the source of the information is verified by an entity filling the prescription using the medical practitioner's public key.

6. A method as set forth in claim 4 wherein the modified information is encrypted using the private key of the entity filling the prescription.

7. A method as set forth in claim 6 wherein a subsequent filler of the prescription verifies the source of the modified data by using the public key of the entity filling the prescription and the source of the information relating to the medical prescription by using the public key of the medical practitioner.

8. An electronic transfer device for securely transferring medical prescription information comprising:

a control portion of the electronic transfer device for storing information provided by a medical practitioner relating to a medical prescription to be filled, the information being stored using encryption information which provides independent verification as to the source of the information, such that an entity filling the prescription may verify that the source of the information is the provider of the medical prescription item;

the control portion of the electronic transfer device capable of being read by the entity filling the prescription for verify the source of the information and for storing information relating to the medical prescription item as modified who the prescription is filled, the modified information being stored using encryption information which provides independent verification as to the source of the modified information.

9. An electronic transfer device as set forth in claim 8 wherein the control portion of the electronic transfer device stores information using public key/private key encryption information provided by the medical practitioner.

10. An electronic transfer device as set forth in claim 9 wherein the control portion of the electronic transfer device stores modified information using public key/private key encryption information provided by the entity filling the prescription.

11. A method for securely transferring medical information comprising:

storing information relating to a medical prescription item on a smart card, using a public key/private key encryption method to provide independent verification as to the source of the information;

verifying the source of the information by the provider of the medical prescription item by using the public key of the provider of the stored information;

modifying the stored information relating to the medical prescription item when the prescription is filled; and storing the modified information on the smart card in an encrypted form using the private key of the provider of the medical prescription item to provide independent verification of the source of the modified information wherein a subsequent provider of the medical prescription item may verify the source of the modified data by using the public key of the provider of the medical prescription item, and the source of the information relating to the medical prescription by using the public key of the provider of the stored information.

12. A method as set forth in claim 11 wherein additional medical information is stored on a portion of the smart card in an unencrypted form.

13. A method as set forth in claim 12 wherein the information stored in unencrypted form comprises information related to medical history information.

* * * * *